United States Patent [19]

Lin

[11] Patent Number: 5,612,111
[45] Date of Patent: Mar. 18, 1997

[54] METHOD OF PRODUCING AND PRODUCT OF HEAT-PROOF LAMINATE BOARD

[75] Inventor: Gary Lin, Taipei, Taiwan

[73] Assignees: Tienchi Trading Co., Ltd.; Tung Yik Trading Co., Ltd., both of Taipei, Taiwan

[21] Appl. No.: 454,593

[22] Filed: May 30, 1995

[51] Int. Cl.⁶ .............................. B32B 3/00; A47B 13/08
[52] U.S. Cl. .................... 428/71; 428/75; 428/81; 428/158; 428/160; 428/167; 428/172; 428/178; 428/182; 428/192; 428/318.8; 428/319.3; 428/913; 264/46.1; 264/45.1; 264/241; 264/286; 156/145; 156/205; 52/309.13; 52/309.9; 52/783; 52/13; 52/784.15
[58] Field of Search ........................... 428/178, 71, 58, 428/75, 81, 158, 160, 167, 172, 182, 192, 318.8, 319.3, 913; 264/46.1, 45.1, 46.4, 167, 241, 286; 156/145, 205; 427/421; 52/309.13, 309.9, 783.13, 783.11, 784.15

[56] References Cited

U.S. PATENT DOCUMENTS 4,695,494  9/1987  Fowler et al. ...................... 428/71
5,102,710  4/1992  Kaufman et al. ...................... 428/71

Primary Examiner—Donald Loney
Attorney, Agent, or Firm—Beveridge, DeGrandi, Weilacher & Young, LLP

[57] ABSTRACT

A method of producing and the product of heat-proof laminate boards are disclosed. Each laminate board cut from a continuous laminate has a corrugated upper layer, a middle foam layer produced by spraying foam agent onto one side of the upper layer which will expand into shape automatically, a bottom layer having opposite edges folded in conformance to the corresponding edges of the upper layer so as to sealedly confine the foam in between the upper layer and bottom layer. The upper layer can be made of one of the materials including steel plate, PVC, PC, PP, aluminum plate, iron sheet. The bottom layer is made of materials including PVC film, PP film, papery film, fabric film, nylon film or wooden fiber sheet.

9 Claims, 5 Drawing Sheets

METHOD OF PRODUCING AND PRODUCT OF HEAT-PROOF LAMINATE BOARD

BACKGROUND OF THE INVENTION

The present invention relates to a method of producing and product of heat-proof laminate boards made up of three interengaged layers. The corrugated upper layer is a steel plate or PVC (Poly Vinyl Chlorid), PC (Poly Carbonate), PP(Polypropylene), aluminum plate, iron sheet. The bottom layer is a PVC film or a PP film, a papery film, fabric film, nylon film, wooden fiber sheet. The middle is a foamed layer produced by means of PU foam agent which expands and becomes so sticky that the upper layer and bottom layer can be integrally bound together naturally by the middle PU foam. Each heat-proof laminate board has the foamed layer partially removed at one end to produce a naked portion, permitting two laminate boards to be partially superimposed end to end. In the same manner, the left side of the corrugated upper layer is provided with an empty engagement groove by not filling foam agent therein so that two laminate boards can be inter-engaged with each other side by side whereby the laminate boards can be assembled one by one.

Conventionally, roofs or walls of factories having a supporting frame made of iron or steel are covered with corrugated boards. The prior art corrugated boards are generally made of asbestos in early stage, but now they are made of glass fiber or metal in consideration of enviromental protection. Such corrugated boards are only used to shelter against rain and generally have poor sound-proof, heat-proof qualities. To get such corrugated boards heat-proof, a layer of laminate board or foamed polystyrene material is added and an extra cover board is needed to make the assembly appealing to the eyes. Such prior art is wasteful in material.

Referring to FIG. 6, two prior art single-layer corrugated laminates are bound together. Such binding is not ready and can be easily borken when blown by strong wind.

SUMMARY OF THE INVENTION

The primary object of the present invention is to provide three-layer heat-proof laminate boards which is also sound-proof and leak-proof. Such laminate boards are simple in structure and easy to produce and assemble.

Another object of the present invention is to provide heat-proof laminate boards having three layers, the bottom layer can be made of PVC film, PP film, papery film, fabric film, nylon film, or wooden fiber sheet; the middle layer is produced by PU foam agent and the upper layer is made of one of the materials: steel plate, PVC, PC, PP, aluminum plate and iron sheet. The middle foam layer can bind the upper layer and bottom layer firmly together as a result of foaming process.

One further object of the present invention is to provide a method to continuously mass produce heat-proof laminate boards on an automatic production line so as to bring down the cost thereof, making the laminate boards popularly adopted by people.

DETAILED DESCRIPTION OF THE PREFERRED EMBODIMENTS

Figure 1:
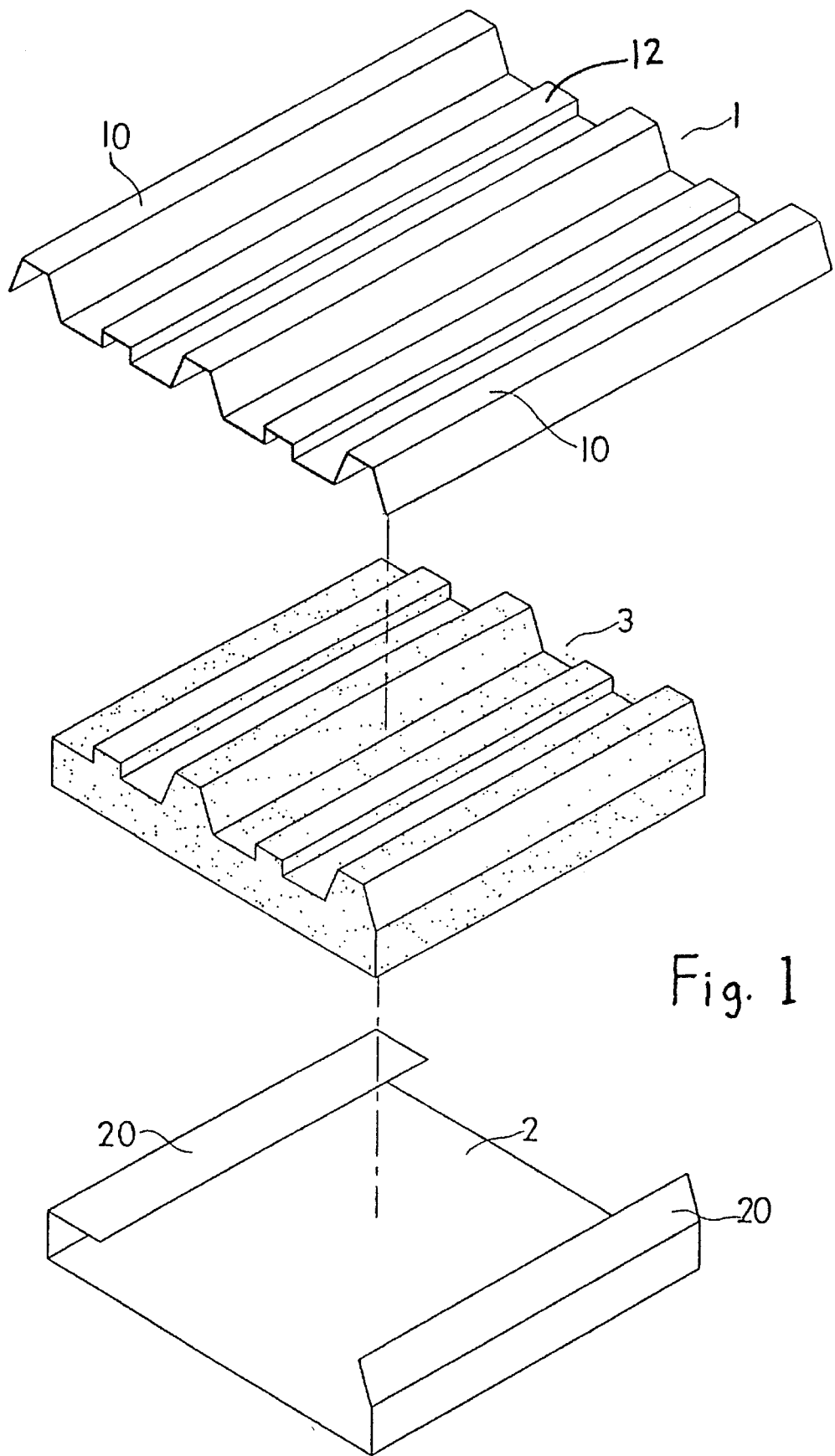
FIG. 1 is a perspective diagram showing the exploded components of the present invention.

Referring to FIG. 1, the present invention is comprised of a corrugated steel plate 1 which can be replaced with PVC, PC, PP, aluminum plate and iron sheet, a PVC film 2 which can be substituted for PP film, papery film, fabric film, nylon film, wooden fiber sheet, and a middle layer made of PU foam.

Figure 2:
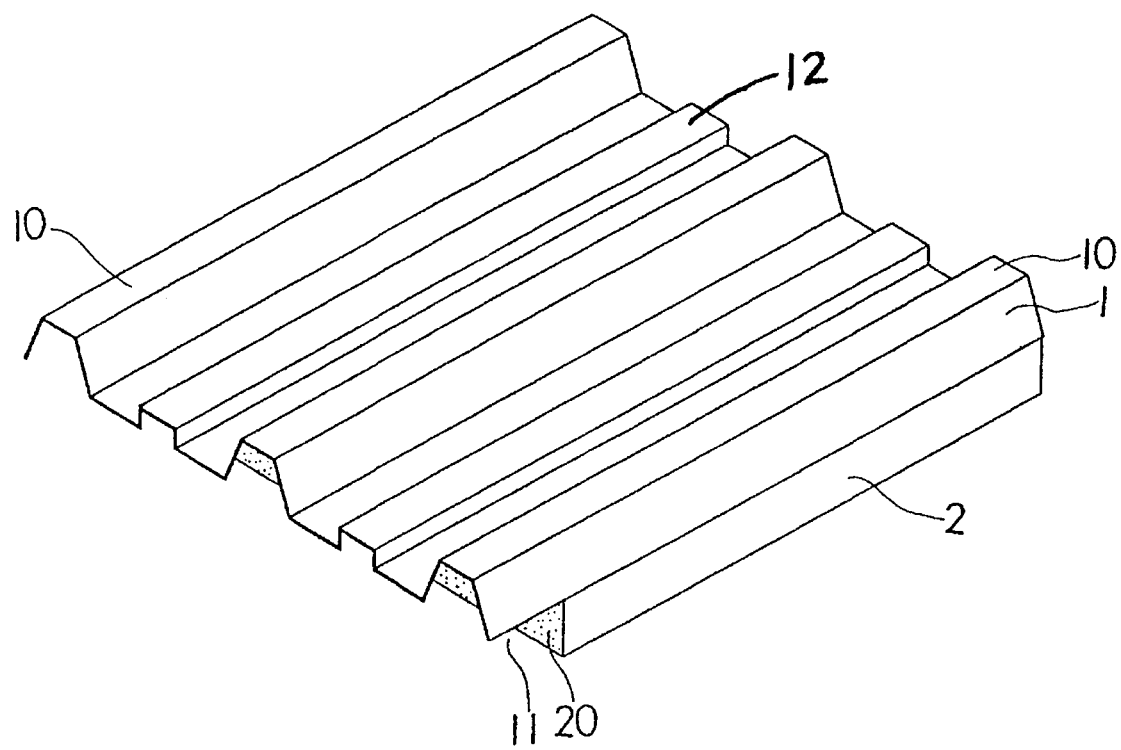
FIG. 2 is a perspective diagram showing the assembly of the present invention.
Figure 3:
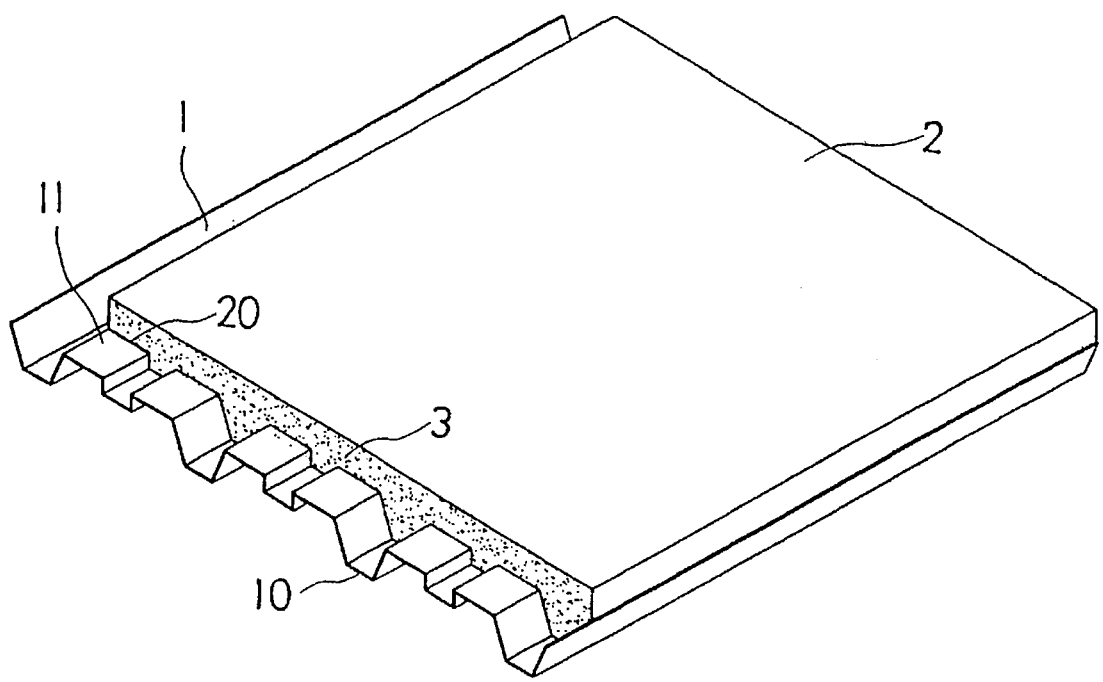
FIG. 3 is a perspective diagram showing the bottom of the present invention.

Rerferring further to FIGS. 2, 3, the corrugated upper layer is a steel plate 1 (PVC, PC, PP, aluminum plate, iron sheet) having an outer appearance of a common corrugated board which is made up of a plurality of concave and convex portions. The bottom layer 2 is a PVC film (PP film, papery film, fabric film, nylon film, wooden fiber sheet). The bottom layer 2 is folded at two edges vertically first and then the ends thereof are bent into a slant flange 20 in conformance to the edges of the corrugated upper layer 1.

After PU foam agent 3 is sprayed onto one side of the corrugated upper layer 1 and the bottom layer 2 having two edges folded in conformance to the ends of the corrugated steel plate 1, the PU foam agent begins to foam and fully expand into shape, and the foamed agent becomes sticky enough to bind the corrugated steel plate 1 or the like material and the PVC film 2 or the like as above cited together.

The bottom layer 2 made of PVC film or the like material has two edges thereof folded into slant flanges 20 in conformance to the sides of the upper layer 1 made of steel plate or the like material as described above. The PU foam agent 3 can be sealedly confined in between the upper layer 1 and the bottom layer 2 in foaming process.

Figure 4:
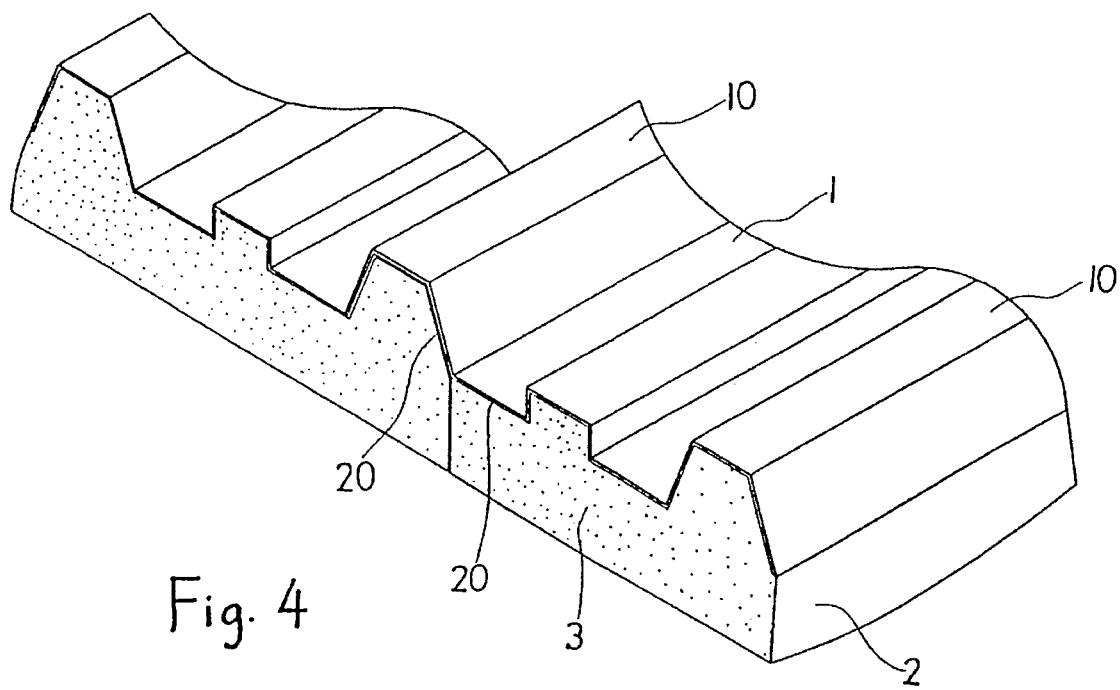
FIG. 4 is a diagram showing two laminate boards partially superimposed side by side in assembly.
Figure 5:
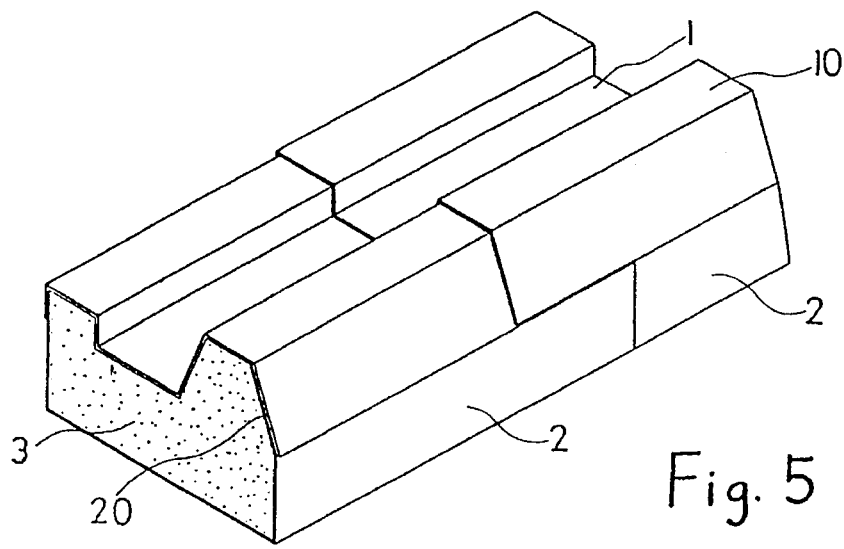
FIG. 5 is a diagram showing two laminate boards partially connected to each other end to end.
Figure 6:
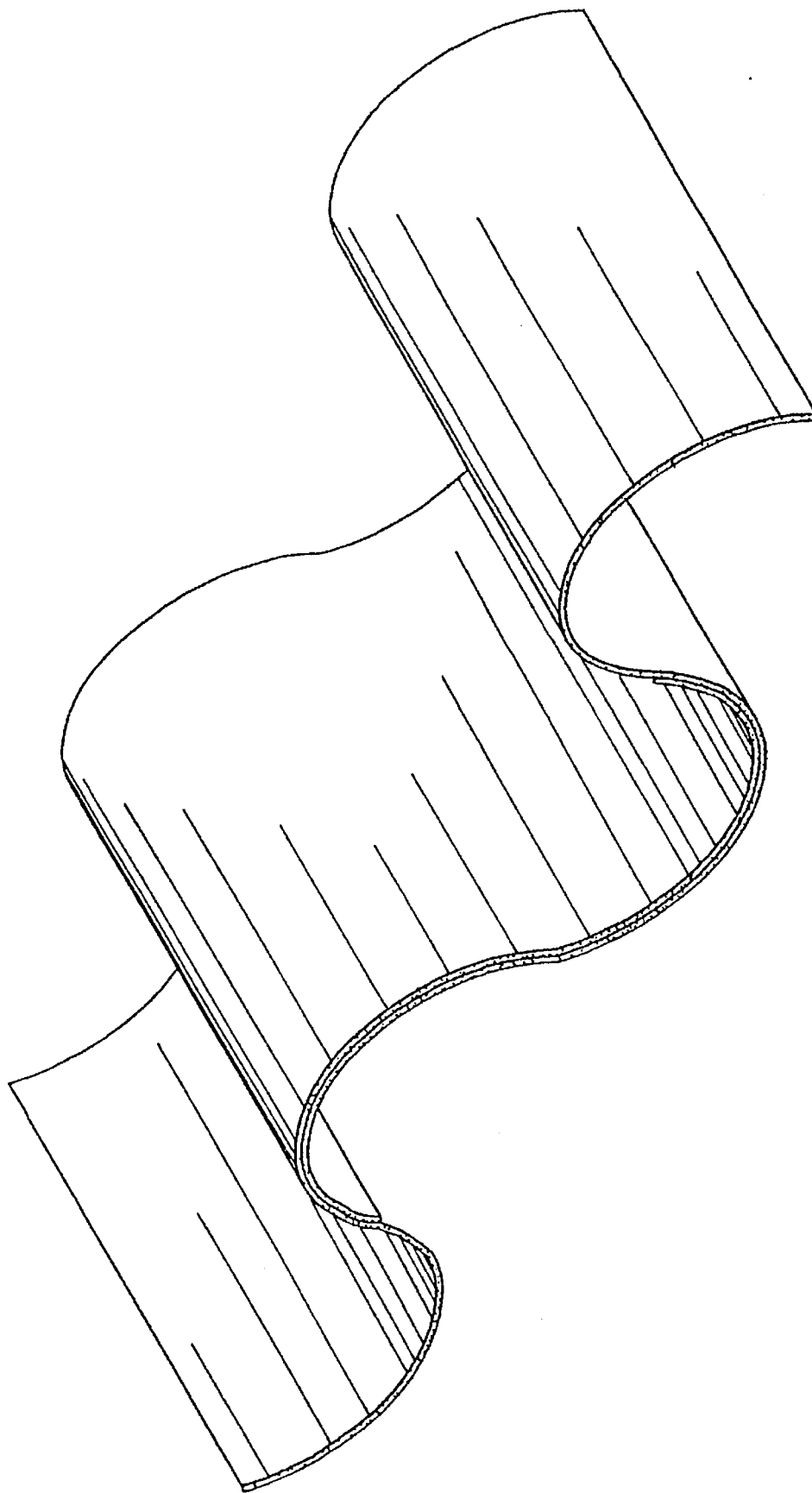
FIG. 6 is a diagram showing a prior art laminate bard.

To permit laminate boards to be easily assembled together piece by piece, the underside of the left convex portion of each corrugated upper layer 1 having a plurality of pairs of first convex portion 10 and second convex portion 12 with each disposed next to the other is not filled with foam agent so as to permit one laminate board in hooking engagement with another neighboring laminate board side by side, as shown in FIG. 4. To facilate the laminate boards to be assembled in another direction, i.e., end to end, the front end of each-laminate board is left a naked portion 11 without foam, as shown in FIG. 3, so that one laminate board can be bridged together end to end as shown in FIG. 5.

The mass production of the laminate boards are carried out in a continuous manner. The corrugated upper layer 1 is delivered continuously by a conveyor belt and the bottom layer 2 made of PVC film or the like material is fed with the same speed of the upper layer 1. The bottom layer 2 is folded at two edges thereof to form flanges 20 in conformance to the edges of the corrugated upper layer 1 at the same time. A space is left between the upper layer 1 and bottom layer 2 for expanded foam. The corrugated upper layer 1 is sprayed with foam agent 3 in proper amount during the delivery and the bottom layer 2 is in abutment with a flat pressing board so that the foam agent will be confined in between the upper and lower layers and foam into shape during the delivery process continuously. The continuous laminate product is cut piece by piece into boards and the foam at each end of the board is removed to make the end naked for ready end-to-end connection in assembly. The connection of laminate boards in either direction in assembly can be clearly shown in FIGS. 4, 5.

I claim:

1. A heat-proof laminate board, comprising:

a corrugated upper layer formed from a material selected from the group consisting of steel plate, polyvinyl chloride, polycarbonate, polypropylene, aluminum plate, and iron sheet, said upper layer having a first, second, third and fourth edges and first and second surfaces, said first edge defining a slant flange and said surfaces defining first and second parallel convex portions;

a sticky middle layer of expandable polyurethane foam;

a bottom layer formed from a material selected from the group consisting of polyvinyl chloride film, polypropylene film, papery film, fabric film, nylon film and wooden fiber sheet, said bottom layer having a first, second, third, and fourth edges and a first surface and a second surface, said first edge of said bottom layer being folded vertically and incorporating a slant flange formed thereon, said slant flange conforming to opposed edges of the upper layer, and said third edge being folded vertically and having a horizontal flange, said bottom layer having a width less than that of the upper layer, so that said sticky middle layer disposed one side of said corrugated upper layer will be sealedly confined in between said corrugated upper layer and said lower layer during foaming process in a manner where said middle layer dimensionally corresponds to the lower layer and is firmly bound with said corrugated upper layer and where the upper layer is offset along said first edge thereof from said middle and lower layers, said offset projecting beyond said bottom layer and said middle foam layer whereby the offset provides an overlap for connection of said boards.

2. The heat-proof laminate board as claimed in claim 1 where the overlap is formed along the first edge of the upper layer and the second edge of the lower layer to permit end-to-end overlapping connection of said boards.

3. The heat-proof laminate board as claimed in claim 1 where the overlap is formed along the second edge of the upper layer and the third of the lower layer to permit side-to-side overlapping connection of said boards.

4. The heat-proof laminate board as claimed in claim 1 where two overlaps are formed, the first along the second edge of the upper layer and the third of the lower layer and the second overlap being formed along the first edge of the upper layer and the second edge of the lower layer to permit both side-to-side and end-to-end overlapping connection of contiguous boards.

5. The heat-proof laminate board as claimed in claim 3 where the corrugated upper layer provides surfaces defining first and second parallel convex portions and where the width of the overlap corresponds to the width Of one convex portion.

6. The heat-proof laminate board as claimed in claim 5 where the first and second parallel convex portions are of different widths and of different depths.

7. A method of production of heat-proof laminate boards having a corrugated upper layer formed from a material selected from the group consisting of steel plate, polyvinyl chloride, polycarbonate, polypropylene, aluminum plate, and iron sheet, said upper layer having a first, second, third and fourth, edges, said first edge defining a slant edge, and first and second surfaces, said surfaces defining first and second parallel convex portions, a sticky middle layer of expandable polyurethane foam and a bottom layer formed from a material selected from the group consisting of polyvinyl chloride film, polypropylene film, papery film, fabric film, nylon film and wooden fiber sheet, said bottom layer having a first, second, third, and fourth edges and a first surface and a second surface and said bottom layer having a width less than that of the upper layer, the method comprising the steps of:

forming edges of said bottom layer, said first edge of said bottom layer being folded vertically and incorporating a slant flange formed thereon conforming to the first edge of the upper layer and said third edge of said bottom layer being folded vertically and having a horizontally directed flange;

delivering said continuous corrugated upper layer by a conveyor belt;

delivering said continuous bottom layer by a conveyor belt, said continuous upper layer and bottom layer being parallelly delivered and spaced apart in a manner where the first surface of said upper layer faces and is opposed to the first surface of said second layer;

spraying said expandable, sticky polyurethane foam onto said first surface of said upper layer so that the sticky polyurethane foam adheres to the first surface of the upper layer and establishes said middle foam layer during delivery process;

conforming said middle layer to dimensionally correspond to said bottom layer;

cutting said continuous laminate into individual boards where each board has a front end, a back end, and two sides dimensionally corresponding to the upper layer;

forming an offset along said first edge of said upper layer where the offset projects beyond the first edge of said bottom layer and said middle foam layer to establish at the front end of each laminate board an overlap for connection of said boards.

8. The method of production of heat-proof laminate board as claimed in claim 2 where the width of said bottom layer being less than the upper layer by the width of one convex portion.

9. The method of production of heat-proof laminate board as claimed in claim 2 where the foam is first sprayed onto the upper layer and then onto the bottom layer and further including the step of contacting the first surface of the second layer with said sticky middle foam layer so that said second layer adheres to said sticky middle foam layer.

* * * * *